(12) United States Patent
Yamashita

(10) Patent No.: US 12,545,323 B2
(45) Date of Patent: Feb. 10, 2026

(54) DRIVE ASSIST DEVICE

(71) Applicant: TOYOTA JIDOSHA KABUSHIKI KAISHA, Toyota (JP)

(72) Inventor: Masahiro Yamashita, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/790,430

(22) Filed: Jul. 31, 2024

(65) Prior Publication Data

US 2025/0162648 A1    May 22, 2025

(30) Foreign Application Priority Data

Nov. 22, 2023    (JP) ................. 2023-198569

(51) Int. Cl.
B62D 15/02    (2006.01)

(52) U.S. Cl.
CPC ................. B62D 15/025 (2013.01)

(58) Field of Classification Search
CPC .................................................. B62D 15/025
USPC ............... 701/41, 42, 43, 44, 48, 70
See application file for complete search history.

(56) References Cited

U.S. PATENT DOCUMENTS

| | | | |
|---|---|---|---|
| 9,835,468 B2 | 12/2017 | Yoshitomi et al. | |
| 10,017,178 B2 | 7/2018 | Morimoto et al. | |
| 10,132,642 B2 | 11/2018 | Yoshitomi et al. | |
| 10,679,077 B2 | 6/2020 | Kinoshita et al. | |
| 11,010,624 B2 | 5/2021 | Hayashi et al. | |
| 11,017,247 B2 | 5/2021 | Hayashi et al. | |
| 11,117,595 B2 | 9/2021 | Sasaki et al. | |
| 2021/0247526 A1 | 8/2021 | Kijima | |

FOREIGN PATENT DOCUMENTS

| | | |
|---|---|---|
| JP | 2014-133477 | 7/2014 |
| JP | 2015-151085 A | 8/2015 |
| JP | 2019-089549 A | 6/2019 |
| JP | 2020-515964 A | 5/2020 |
| KR | 10-2023-0033226 A | 3/2023 |
| WO | 2018/178844 A1 | 10/2018 |

*Primary Examiner* — Hai H Huynh
(74) *Attorney, Agent, or Firm* — SoraIP, Inc.

(57) ABSTRACT

The drive assist device assists the driver in driving the vehicle. The drive assist device includes a recognition sensor, a steering actuator, and an electronic control unit. The recognition sensor recognizes a situation in front of the vehicle. The steering actuator performs steering of the vehicle. The electronic control unit controls the steering actuator so as to suppress a lane deviation of the vehicle from the traveling lane. The electronic control unit recognizes a curve sign for prompting the driver's attention to a curve in front of the vehicle using the recognition sensor, and when the curve sign is recognized, increases a steering assist amount of the steering actuator for suppressing a lane departure during passage of the curve as compared with a case where the steering assist amount passes through the curve without recognition of the curve sign.

4 Claims, 6 Drawing Sheets

FIG. 1
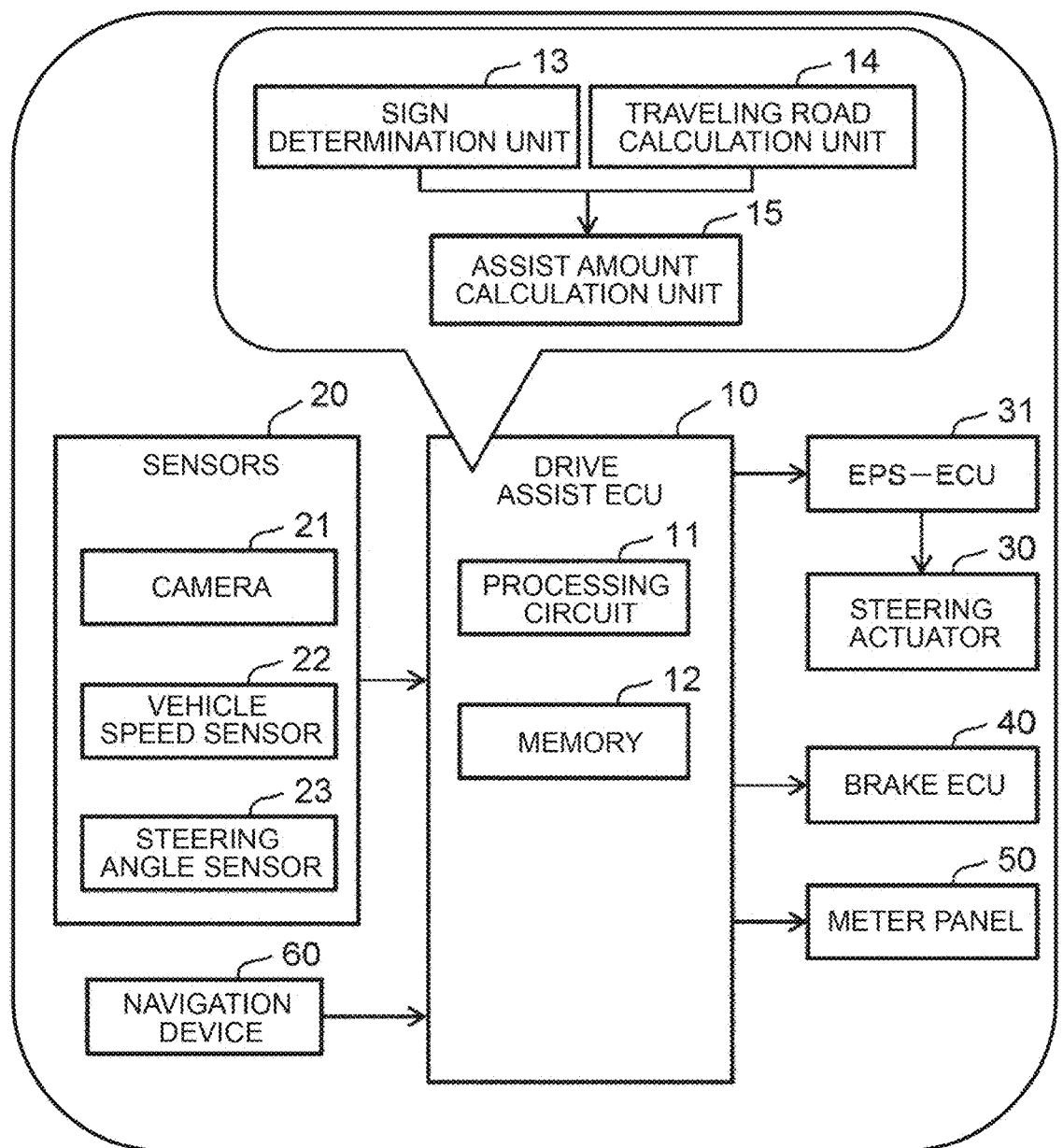
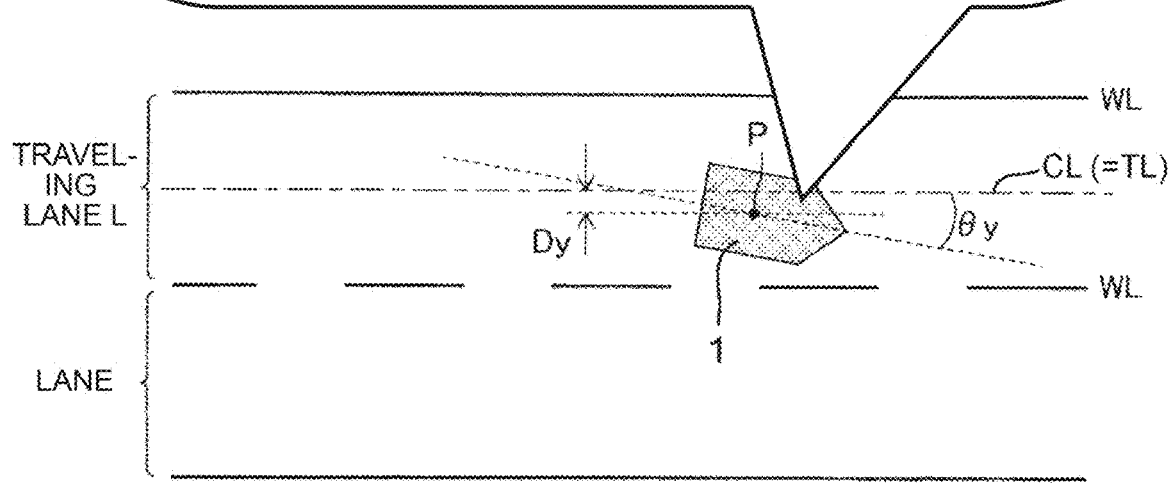

FIG. 6
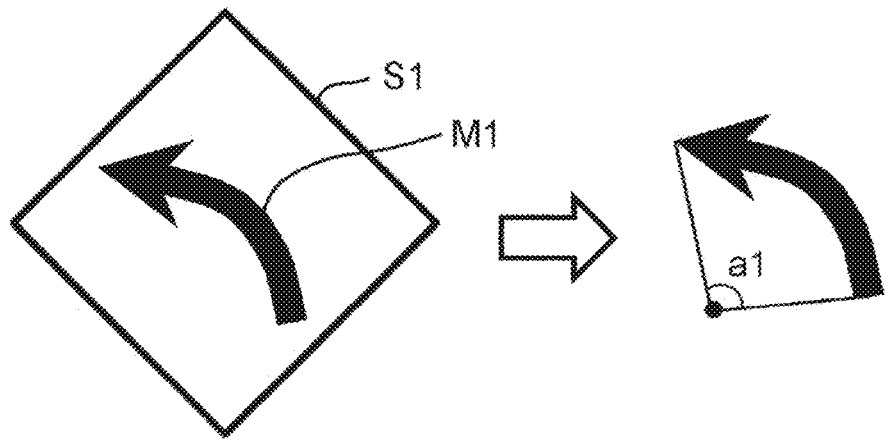
CURVE BENDING DIRECTION: ONE DIRECTION
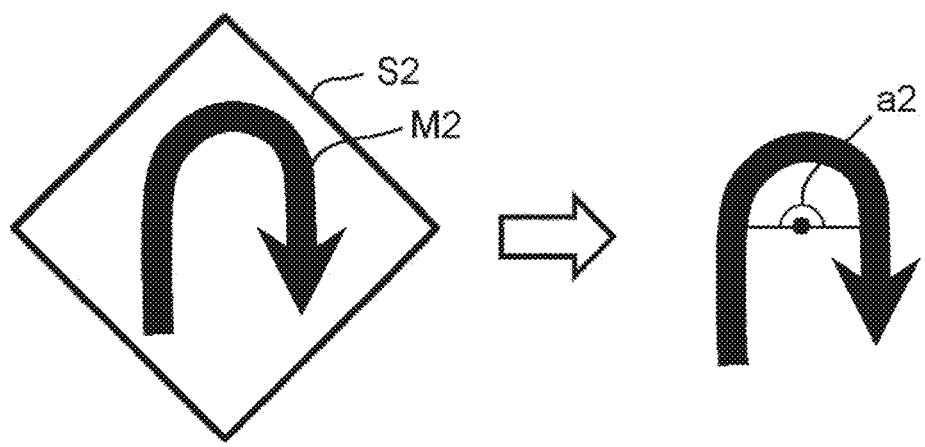
CURVE BENDING DIRECTION: ONE DIRECTION
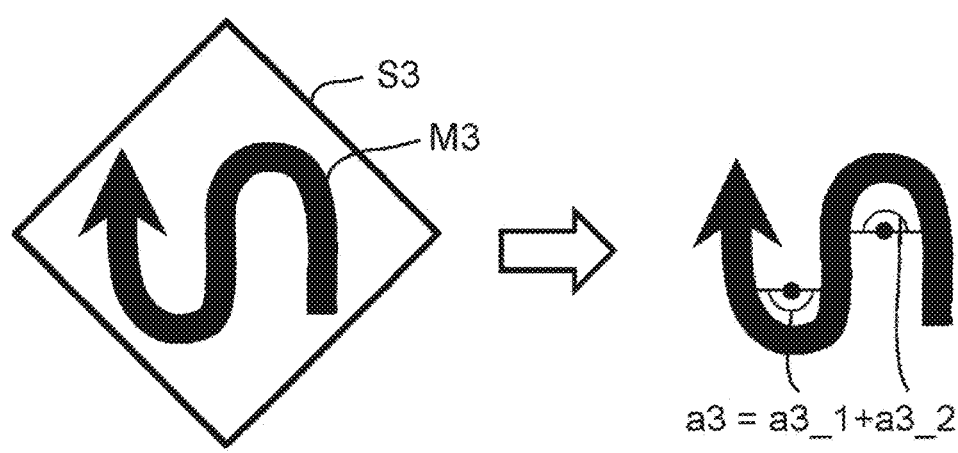
CURVE BENDING DIRECTION: BIDIRECTIONAL

DRIVE ASSIST DEVICE

CROSS-REFERENCE TO RELATED APPLICATION

This application claims priority to Japanese Patent Application No. 2023-198569 filed on Nov. 22, 2023, incorporated herein by reference in its entirety.

BACKGROUND

1. Technical Field

The present disclosure relates to a drive assist device that suppresses lane departure.

2. Description of Related Art

Japanese Unexamined Patent Application Publication No. 2015-151085 (JP 2015-151085 A) discloses a vehicle control device that executes lane keep assist control for keeping a traveling road of a vehicle to a target traveling road. When steering power calculated by adding the product of a steering speed and a steering torque and the product of a steering angle and a derivative of the steering torque exceeds a predetermined value, the vehicle control device reduces a control amount of the lane keep assist control as compared with the case where the steering power is less than the predetermined value.

SUMMARY

In the technology described in JP 2015-151085 A, when there is a steep curve ahead of the vehicle, it may be difficult to continue the lane keep assist control unless the control amount is changed in advance.

The present disclosure has been made in view of the above problem, and an object of the present disclosure is to provide a drive assist device that can appropriately execute lane keep assist control even when a vehicle travels on a steep curve.

A drive assist device according to the present disclosure is configured to assist a driver in driving a vehicle.
The drive assist device includes a recognition sensor, a steering actuator, and an electronic control unit. The recognition sensor is configured to recognize a situation ahead of the vehicle. The steering actuator is configured to steer the vehicle. The electronic control unit is configured to control the steering actuator to suppress lane deviation of the vehicle from a traveling lane.
The electronic control unit is configured to recognize, using the recognition sensor, a curve sign for prompting the driver to pay attention to a curve ahead of the vehicle.
The electronic control unit is configured to, when the curve sign is recognized, increase a steering assist amount of the steering actuator for suppressing lane deviation during passage of the curve as compared with a case where the vehicle passes the curve without recognition of the curve sign.

According to the present disclosure, it is possible to appropriately execute the lane keep assist control using the curve sign recognized by using the recognition sensor even when the vehicle travels on a steep curve.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram schematically illustrating an example of a configuration of a vehicle including a drive assist device according to an embodiment;

FIG. 6 is a diagram illustrating curve signs S1 to S3.

DETAILED DESCRIPTION OF EMBODIMENTS

1. Configuration Example of the Vehicle

Figure 2A:
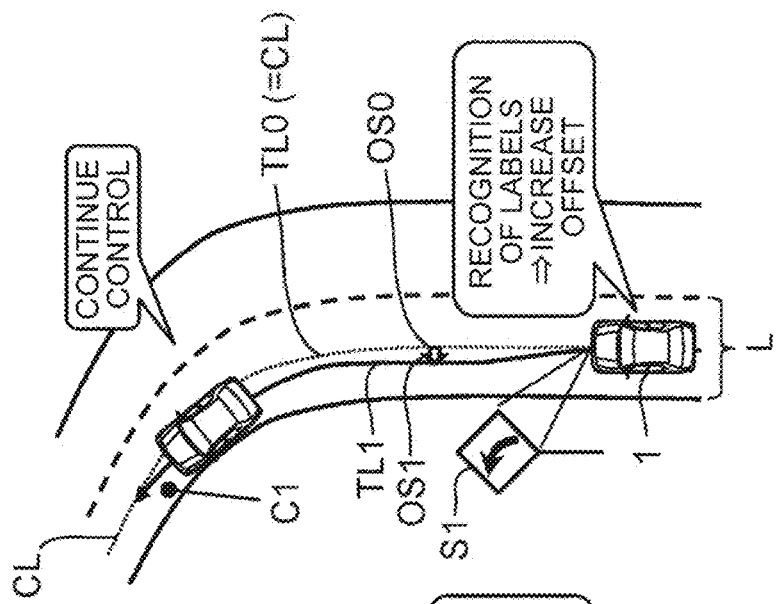
FIG. 2A is a diagram for explaining a problem of lane keeping assist control.

FIG. 1 is a diagram schematically illustrating an example of a configuration of a vehicle 1 including a drive assist device according to an embodiment.

The vehicle 1 includes a drive assist electronic control unit (a drive assist ECU) 10. Drive assist ECU (or simply, ECU) 10 performs drive assist control for assisting the driver in driving the vehicle 1. ECU 10 includes a processing circuit 11 and a memory 12. The processing circuit 11 executes various kinds of processing related to drive assistance of the vehicle 1. The memory 12 stores various kinds of information necessary for processing by the processing circuit 11. When the processing circuit 11 executes various computer programs, various kinds of processing by the processing circuit 11 are realized. The various computer programs are stored in the memory 12 or recorded in a computer-readable recording medium. ECU 10 may be configured by combining a plurality of ECU.

The vehicle 1 includes sensors 20. The sensors 20 include, for example, a camera 21, a vehicle speed sensor 22, and a steering angle sensor 23. The camera 21 is disposed at a front portion of the vehicle 1 and recognizes a situation in front of the vehicle 1. The "recognition sensor" according to the present disclosure includes a sensor that can be used for recognition of a sign by an ECU 10, such as the camera 21. The vehicle speed sensor 22 detects the speed (vehicle speed) of the vehicle 1. The steering angle sensor 23 detects a steering angle of the vehicle 1.

Further, the vehicle 1 includes a steering actuator 30 and an EPS-ECU 31. The steering actuator 30 generates a force for steering a wheel (for example, a front wheel) of the vehicle 1. The steering actuator 30 can assist the driver in steering, and can steer the wheels independently of the driver's steering. For example, the steering actuator 30 is a steering assist motor of an electric power steering system (EPS). The steering actuator 30 is controlled by, for example, an EPS-ECU 31 included in EPS. The control of the steering actuator 30 by EPS-ECU 31 includes control based on a command from the drive assist ECU 10 to EPS-ECU 31.

The vehicle 1 further includes a brake ECU 40, a meter panel 50, and a navigation device 60. The brake ECU 40 controls a brake actuator that generates a braking force of the vehicle 1. The control of the brake actuator by the brake ECU 40 includes control based on a command from the drive assist ECU 10 to the brake ECU 40. The meter panel 50 is an example of a display device that is disposed in the interior of the vehicle 1 and displays display information to the driver. The navigation device 60 is configured to be able to communicate with an external system via a wireless communication network, and can acquire various information such as road information and vehicle position information from the external system.

In the example of the vehicle 1 having the above-described configuration, the "drive assist device" according to the present disclosure includes a drive assist ECU 10, a camera 21, and a steering actuator 30.

2. Lane Keeping Assist Control

The drive assist control of the vehicle 1 executed by the drive assist ECU 10 includes "lane keeping assistance control". In the following explanation, the lane keeping assist control is referred to as lane tracing assist (LTA). LTA includes controlling the steering actuator 30 so as to suppress a deviation (lane deviation) of the vehicle 1 from the traveling lane.

2-1. Basic Configuration

When LTA is requested by the driver's manipulation of the predetermined operating device, the drive assist ECU 10 executes LTA. In LTA, ECU 10 applies a steering torque to the steering mechanism so that the position of the vehicle 1 (host vehicle) is maintained in the vicinity of the target travel line TL in the traveling lane L (see FIG. 1) to assist the driver in steering operation. The target travel line TL is, for example, a lane center line CL, but may be offset from the lane center line CL by a predetermined distance in the lane width direction.

ECU 10 calculates the target steering angle δt of LTA at a predetermined calculation cycle based on, for example, the curvature R, the yaw angle θy, and the lateral deviation Dy. The curvature R is a curvature R of a curve of the lane center line CL (see FIG. 2B described later). The yaw angle θy is an angle formed between the direction of the lane center line CL and the direction facing the vehicle 1. The lateral deviation Dy is a distance between the center of gravity P of the vehicle 1 and the lane center line CL. ECU 10 can acquire information on the left and right white lines WL, the lane center line CL, the curvature R, the yaw angle θy, and the lateral deviation Dy that define the traveling lane L of the vehicle 1 based on the image information of the camera 21. For the yaw angle θy and the lateral deviation Dy, the left-right direction with respect to the lane center line CL is specified by a sign (positive or negative). In addition, the curvature R is specified by a sign (positive or negative) in the bending direction (right or left) of the curve.

The calculation equation of the target steering angle δt includes, for example, a product of the curvature R and the control gain (first term), a product of the yaw angle θy and the control gain (second term), and a product of the lateral deviation Dy and the control gain (third term). The first term is a steering angle component that is determined in accordance with the curvature R of the road and operates in a feed-forward manner. The second term is a steering angle component that works in a feedback-like manner so as to reduce the yaw angle θy (that is, so as to reduce the deviation of the direction of the vehicle 1 with respect to the lane center line CL). That is, the steering angle component is calculated by feedback control in which the target value of the yaw angle θy is set to zero. The third term is a steering angle component that works in a feedback-like manner so as to reduce a lateral deviation Dy that is a deviation (positional deviation) of the lane widthwise position of the vehicle 1 with respect to the lane center line CL. That is, the steering angle is calculated by the feedback control in which the target of the lateral deviation Dy is set to zero.

According to LTA, for example, when the lane center line CL is curved in the leftward direction, when the vehicle 1 is laterally shifted in the rightward direction with respect to the lane center line CL, or when the vehicle 1 is directed in the rightward direction with respect to the lane center line CL, the target steering angle δt is calculated so that the target steering angle δ becomes the leftward steering angle. The target steering angle δt calculated in this way or the target steering torque for obtaining the target steering angle δt corresponds to the steering quantity by LTA. The steering amount by LTA corresponds to an exemplary "steering assist amount" according to the present disclosure.

2-2. Correction of Steering Assist Amount Using Curve Marking

FIG. 2A is a diagram for explaining a problem of lane keeping assist control. FIG. 2A shows an example of a traveling scene in which a curve C1 exists in front of the vehicle 100 on a traveling road such as a mountain road. The curve C1 is a steep curve. For this reason, a curve sign (warning sign) S1 for urging the driver's attention to the curve C1 is installed on the road side in front of the vehicle 100 prior to entering the curve C1.

In the vehicle 100 according to the comparative example shown in FIG. 2A, unlike the present embodiment, LTA that does not use the recognition of the curve sign S1 of the curve C1 by the camera is executed. Consequently, even though a steep curve C1 in which the curve sign S1 is installed is in front of the vehicle 100, the vehicle 100 enters the curve C1 while the steering assist amount of LTA is not appropriately changed in advance in view of the presence of the curve C1. Consequently, in this comparative example, LTA cannot be continued while the curve C1 passes, and LTA ends. In addition, the curvature R of the curve C1 can be obtained prior to entry into the curve C1. However, for example, when the curve C1 is a curve that largely goes around, it may be difficult to grasp the curvature R of the entire curve C1 prior to entering the curve C1 only by using the above-described traveling road data.

In view of the above-described problems, the drive assist ECU 10 executes a "recognition process" for recognizing the curve sign S using the camera 21. Specifically, in the recognition process, ECU 10 recognizes the curve sign S by analyzing the image of the camera 21 using, for example, an image recognition artificial intelligence (AI) generated in advance by machine learning.

Then, when the curve sign S is recognized, ECU 10 executes an "assist increasing process" in which the steering assist amount AS of the steering actuator 30 for suppressing the lane departure during the passage of the curve is increased as compared with the case where the curve sign S passes through the curve C without being recognized.

2-2-1. First Embodiment

Figure 2B:
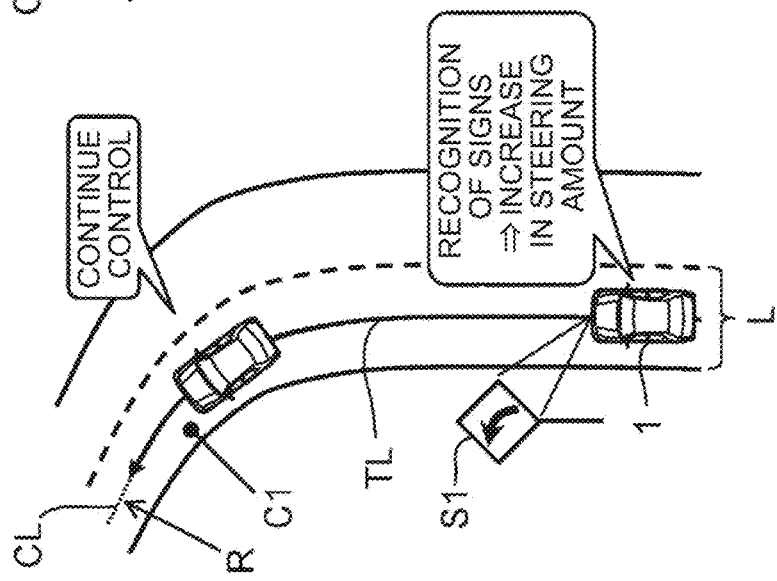
FIG. 2B is a diagram for explaining a first specific example of lane keeping assist control.

FIG. 2B is a diagram for explaining a first specific example of lane keeping assist control according to an embodiment. In the first embodiment, the target steering angle δt, which is calculated as "the steering amount in the direction of turning the wheels toward the inside of the curve C1", corresponds to the steering assist amount AS in the assist increasing process.

In the first embodiment, when there is a steep curve C1 in front of the vehicle 1, the curve sign S1 is recognized by the recognition process as shown in FIG. 2B. Then, by the assist increasing process, the target steering angle δt is calculated so as to be larger than that when the curve sign S1 is not recognized (FIG. 2A). Consequently, when the vehicle 1 passes through the curve C1 thereafter, the steering assist amount AS is increased as compared with when the vehicle passes through the curve C1 without recognizing the curve sign S1.

According to the first embodiment, even when traveling in a steep curve C1, LTA can be appropriately continued.

2-2-2. Second Specific Example

Figure 2C:
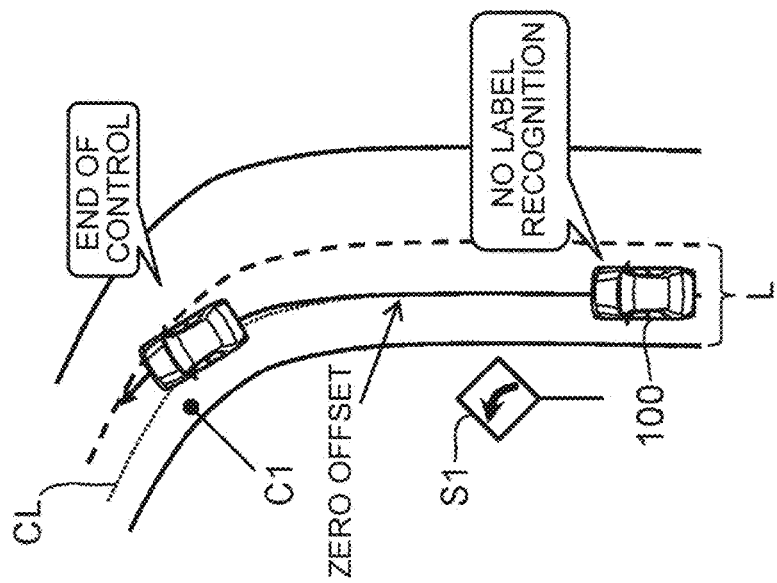
FIG. 2C is a diagram for explaining a second specific example of lane keeping assist control.

FIG. 2C is a diagram for explaining a second specific example of lane keeping assist control according to the embodiment. In the second embodiment, the "offset amount OS for offsetting the traveling position of the vehicle 1 in the lane-width direction on the traveling lane L to the inside in the curve C1 with respect to the center of the traveling lane L" corresponds to the steering assist amount AS in the assist increasing process. The offset amount OS is specified by the target travel line TL.

In a second embodiment, when there is a steep curve C1 in front of the vehicle 1, the curve sign S1 is recognized by the recognition process as shown in FIG. 2C. Further, the increase in the steering assist amount AS by the assist increase process in the second embodiment is realized by setting an offset amount OS1 which is largely offset to the inside of the curve C1 as compared with the offset amount OS0 specified by the target travel line TL0 without recognizing the curve sign S1, prior to the entry into the curve CL. In the exemplary embodiment shown in FIG. 2C, the offset amount OS0 of the target travel line TL0 is zero. That is, the target travel line TL0 is equal to the lane center line CL. However, the target travel line TL0 may be different from the lane center line CL.

According to the second specific example, by increasing the offset amount OS prior to entering curve C1, it is possible to make it easier to continue LTA even if the lateral deviation Dy expands toward the outside of the curve C1 during the passage of the steep curve C1.

As described with reference to the first and second specific examples, according to the drive assist device of the present embodiment, it is possible to appropriately execute the lane keeping assist control by using the curve sign S recognized by using the camera 21 even when traveling on a steep curve.

In addition, the present method using the recognition information of the curve sign S has the following advantages as compared with the method using the road information of the navigation device 60. That is, for example, in a case where a new curve sign S is installed, it takes time for information of the newly installed curve sign S to be reflected in the road information of the navigation device 60. On the other hand, according to the present method, it is possible to recognize the newly installed curve sign S and reflect it in LTA without such a delay. In addition, there is a possibility that the information of the navigation device 60 cannot be used in a place where a communication environment such as a mountainous area is not good. According to the present method, such a problem does not occur.

The steering assist amount AS may be both (combined) the steering amount (target steering angle δt) and the offset amount OS.

2-2-3. Process Flow

In order to execute a process related to LTA, the drive assist ECU 10 includes a sign determination unit 13, a traveling road calculation unit 14, and an assist amount calculation unit 15 as functional blocks (see FIG. 1). These functional blocks are realized by cooperation of a processing circuit 11 that executes a computer program and a memory 12.

Figure 3:
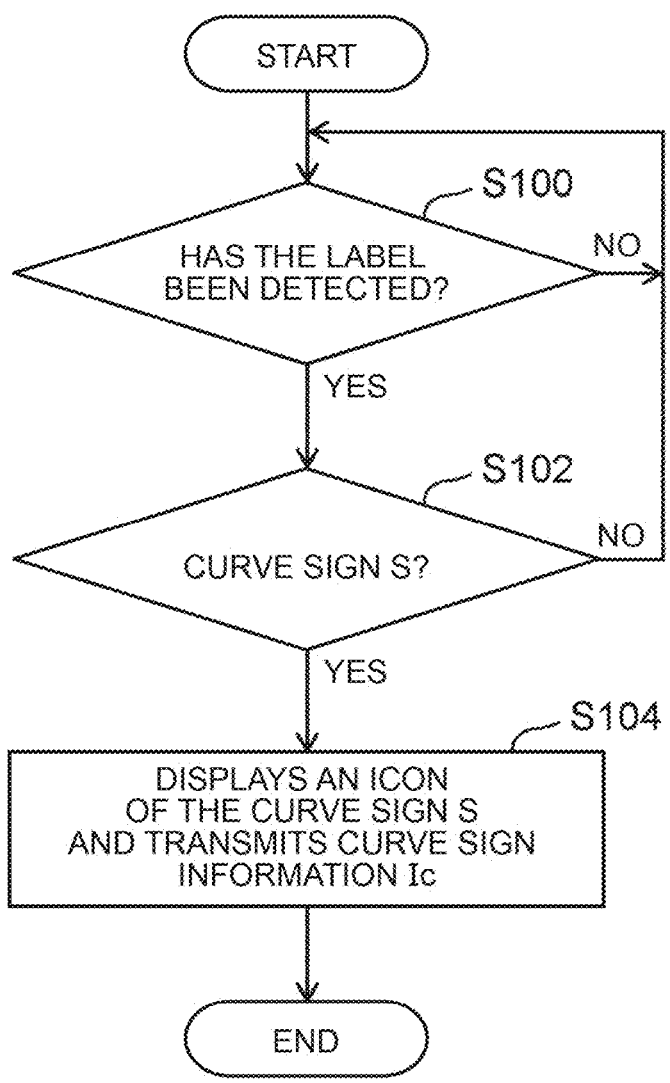
FIG. 3 is a flowchart showing processing of the sign determination unit shown in FIG. 1.

FIG. 3 is a flowchart showing a process of the sign determination unit 13 shown in FIG. 1. The processing of this flowchart and the processing of the flowcharts illustrated in FIGS. 4 and 5 described later are executed in parallel by ECU 10 (processing circuitry 11). Here, the first specific embodiment, in which the steering assist amount AS is the target steering angle δt as the "steering amount in a direction in which the wheel is steered toward the inside of the curve C1", will be mainly described.

The sign determination unit 13 determines what kind of sign the sign recognized by using the camera 21 is, and classifies the sign.

Specifically, in S100, it is determined whether or not a sign is detected on the basis of the image-information of the camera 21. Consequently, if no label is detected, S100 process is repeated. On the other hand, if a label is detected, the process proceeds to S102.

In S102, it is determined whether the detected sign is a curve sign S. Consequently, if the detected sign is not the curve sign S, the process returns to S100. On the other hand, if the detected sign is the curve sign S, the process proceeds to S104. In addition, the processing of S100 and S102 corresponds to the "recognition processing" described above.

In S104, a process of displaying an icon indicating the curve sign S on the meter panel 50 is executed. Specifically, the memory 12 of the ECU 10 stores icons indicating the curve sign S. S104 process includes a process of reading the data of the icon indicating the curve sign S from the memory 12. The icon displayed on the meter panel 50 is, for example, a specific one icon. Further, in S104, a process of transmitting the "curve sign information Ic" to the assist amount calculation unit 15 is also executed. The curve sign information Ic includes at least information indicating that the curve sign S has been recognized by the sign determination unit 13.

In addition, as illustrated in FIG. 6, which will be described later, there are various types of curve sign S. Therefore, S104 process may include, for example, a process of specifying the type of the curve sign S using the image-recognition AI. The process of specifying the type of the curve sign S in this manner also corresponds to the above-described "recognition process". The memory 12 may store data of icons indicating various curve sign S. S104 process may include a process of reading the data of the icon of the curve sign S of the specified type from the memory 12 and displaying the data on the meter panel 50.

Further, the curve sign information Ic transmitted from the sign determination unit 13 to the assist amount calculation unit 15 may include sign type information Ic1 indicating the type of the curve sign S specified as described above. Specifically, the sign type information Ic1 may include, for example, information of the sum angle a, which will be described later with reference to FIG. 6, for each type of the curve sign S. In addition, the sign type information Ic1 may include, for each type of the curve sign S, bending direction information indicating, for example, whether the curve sign S is a curve that bends only on one of the left and right sides or a curve that bends both of the left and right sides.

Figure 4:
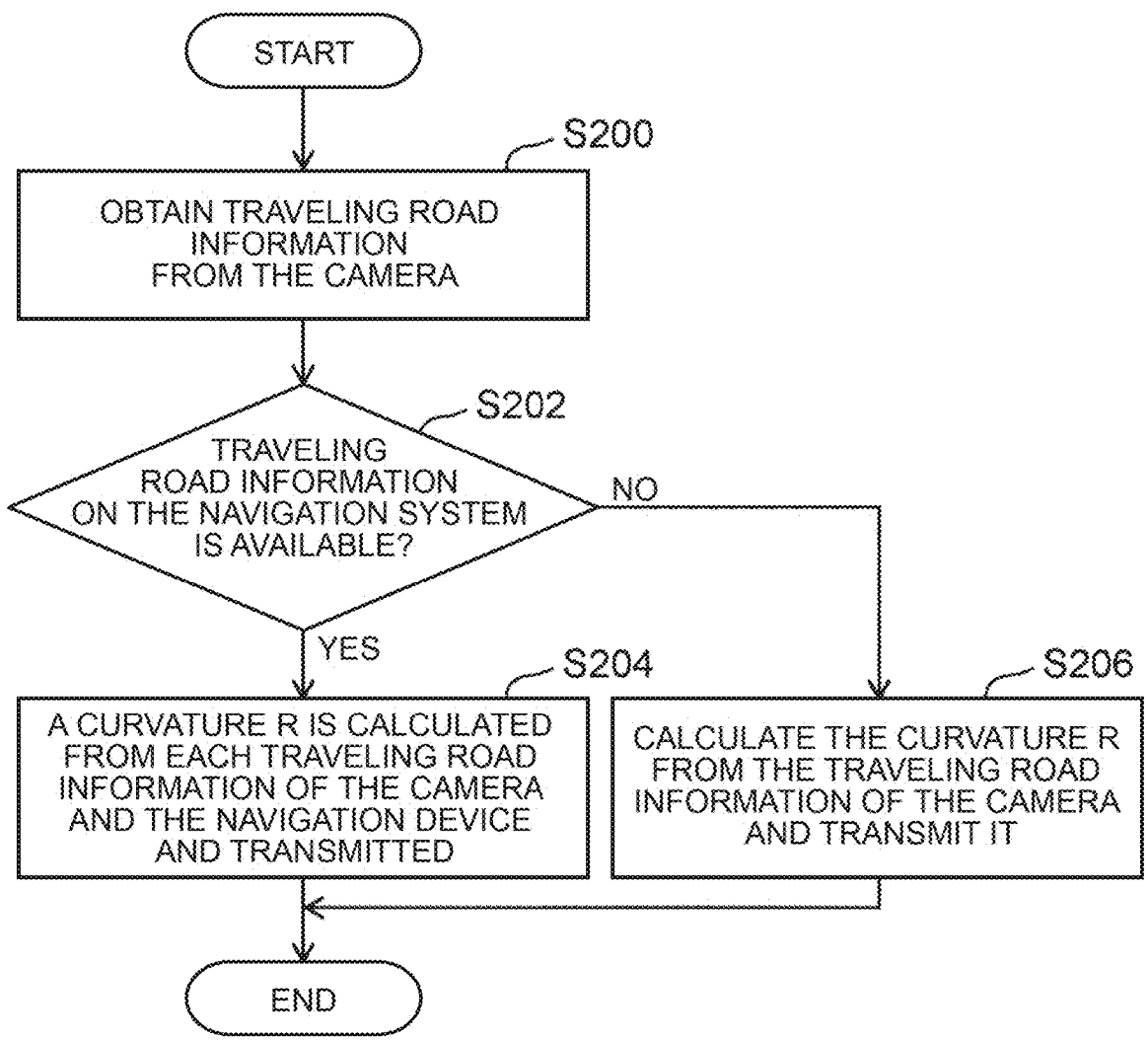
FIG. 4 is a flowchart showing the processing of the traveling road calculation unit shown in FIG. 1.

FIG. 4 is a flowchart showing the processing of the traveling road calculation unit 14 shown in FIG. 1. The traveling road calculation unit 14 calculates the curvature R of the traveling road ahead of the vehicle 1 using the traveling road information based on the image of the camera 21. The traveling road data includes, for example, left and right white lines WL that define the traveling lane L and a lane center line CL. As described above, the curvature R is the curvature of the curve of the lane center line CL of the traveling lane L of the vehicle 1.

Specifically, in S200, the traveling road data is acquired from the camera 21. Next, in S202, it is determined whether or not the traveling road information of the navigation device 60 is present (that is, whether or not the traveling road information is received by ECU 10).

If there is also traveling road information of the navigation device 60, the curvature R is calculated from the traveling road information of the camera 21 and the navigation device 60 (S204). On the other hand, when there is no traveling road information of the navigation device 60, the curvature R is calculated only from the traveling road information of the camera 21 (S206). The curvature R can be calculated using a known method. The curvature R calculated in S204 or S206 is transmitted from the traveling road calculation unit 14 to the assist amount calculation unit 15.

Figure 5:
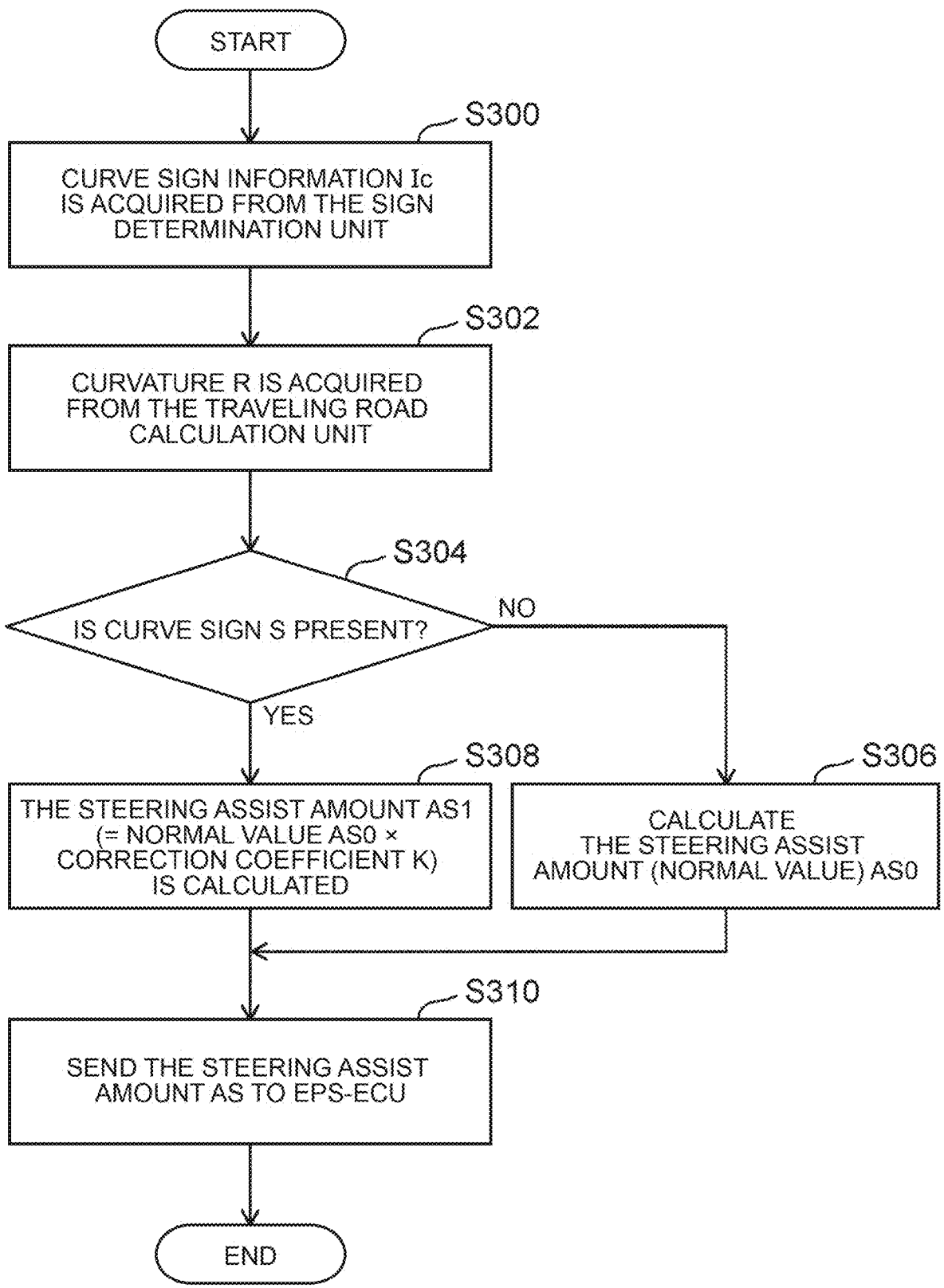
FIG. 5 is a flow chart showing a process of the assist amount calculation unit shown in FIG. 1.

FIG. 5 is a flowchart showing the processing of the assist amount calculation unit 15 shown in FIG. 1. When the sign determination unit 13 recognizes that the sign is the curve sign S, the assist amount calculation unit 15 makes the steering assist amount AS larger than the normal value AS0 based on the curvature R calculated by the traveling road calculation unit 14.

Specifically, in S300, the curve sign information Ic transmitted from the sign determination unit 13 is acquired. Next, in S302, the curvature R transmitted from the traveling road calculation unit 14 is acquired.

Next, in S304, it is determined whether or not the curve sign S is present based on the curve sign information Ic (i.e., whether or not the curve sign S is recognized). If the curve sign S does not exist, the process proceeds to S306.

In S306, a normal value AS0 of the steering assist amount AS of LTA is calculated. Specifically, in the first embodiment, the normal value $\delta t0$ of the target steering angle $\delta t$ corresponding to the normal value AS0 is calculated based on the lateral deviation Dy and the yaw angle $\theta y$ together with the curvature R, for example, by the method described in Section 2-1 of the basic configuration of LTA. In the second embodiment in which the steering assist amount AS is the offset amount OS, the normal value OS0 of the offset amount OS corresponding to the normal value AS0 is specified based on the target travel line TL0. For example, when the target travel line TL0 is equal to the lane center line CL, the offset amount OS0 that is zero corresponds to the normal value AS0.

On the other hand, when the curve sign S is present (S304; Yes), the process proceeds to S308. In S308, the corrected steering assist amount AS1 using the curve sign S is calculated. Specifically, the normal value AS0 is calculated in the same manner as in S306 process, and the steering assist amount AS1 is calculated by multiplying the normal value AS0 by the correction coefficient K. In the second specific example in which the steering assist amount AS is the offset amount OS, the offset amount OS1 corresponding to the corrected steering assist amount AS1 is calculated by multiplying the offset amount OS0 corresponding to the normal value AS0 by the correction coefficient K.

Example of Setting of Correction Coefficient K

The correction coefficient K is a positive value, and can be set using various methods as follows, for example.

The setting example described first is directed to a first specific example in which the target steering angle $\delta t$ is used as the steering assist amount AS. When the vehicle speed can be regarded as constant, the lateral acceleration Gy of the vehicle 1 during turning can be specified by the steering angle $\delta$. In this configuration, the relation between the vehicle speed, the steering angle $\delta$, and the lateral acceleration Gy is used. Specifically, the correction coefficient K is determined such that the target steering angle $\delta t1$ corresponding to the corrected steering assist amount AS1 is a steering angle value that causes a lateral acceleration Gy1 (e.g., 0.3 G) higher by a predetermined amount with respect to the lateral acceleration Gy0 (e.g., 0.2 G) in a normal state at the present vehicle speed. The normal lateral acceleration Gy0 is a value of the lateral acceleration Gy generated when the steering is performed according to the normal value $\delta t0$.

Alternatively, the correction coefficient K may be, for example, a fixed value set in advance.

Further, in the case where the curve sign information Ic includes the sign type information Ic1, the correction coefficient K may be set using, for example, the following method. FIG. 6 is a diagram illustrating curve signs S1 to S3, which are respective specific examples of curve signs S. The curve mark M1 in the curve sign S1 exemplifies a curve that bends only to one of the left and the right (for example, to the left). Curve mark M2 in the curve sign S2 exemplifies a curve that turns only to one of the left and right (e.g., the right), and more specifically, a curve that turns largely to the right. The curve mark M3 in the curve sign S3 exemplifies a curve that turns both left and right, and more specifically, a curve that goes around both left and right.

The angle a1 in the upper drawing of FIG. 6 indicates the angle (=total angle) of the circular arc included in the curve mark M1. The angle a2 in the drawing in FIG. 6 indicates the angle (=total angle) of the circular arc included in the curve mark M2. Angles a3_1 and a3_2 in the lower drawing of FIG. 6 indicate the respective angles of the two circular arcs included in the curve mark M2, and the sum of angles a3_1 and a3_2 is the sum angle a3. As can be seen by comparing the figures, the sum-angle a of the arcs is followed by the curve mark M3 being the largest, in order of curve mark M2 and ML. In other words, the total angle a indicates the magnitude of the degree of wraparound of the curve represented by the curve mark M. This degree of wraparound is followed by the curve mark M3 being the largest, in order of curve mark M2 and M1.

The correction coefficient K may be set as follows in consideration of the type of the curve sign S. That is, for example, when the total angle a is larger than the predetermined threshold value (for example, a2 and a3), the correction coefficient K may be set to be larger than when the total angle a is equal to or smaller than the threshold value (for example, a1). Alternatively, the correction coefficient K may be set to be larger as the total angle a is larger, for example. According to these settings, the corrected steering assist amount AS1 is larger when the total angle a is large than when the total angle a is small. Accordingly, the steering assist amount AS1 can be appropriately determined according to the degree of the wraparound of the curve C by using the recognition result of the curve sign S. As a consequence, LTA can be continued more appropriately than in cases where this point is not considered. In addition, the total angle a can be obtained, for example, by reading the information of the total angle a for the recognized curve sign S from the sign type information Ic1 in the memory 12. Alternatively, the total angle a may be obtained directly, for example, by analyzing an image of the curve mark M of the curve sign S obtained by the camera 21.

Further, the correction coefficient K may be set as follows in consideration of the type of the curve sign S. That is, in a case where the curve mark M indicates a curve that bends in both the left and right directions (for example, M3), the curve mark M may be set to be larger than a case where the curve mark M indicates a curve that bends only in one of the left and right directions (for example, M1 and M2). As a consequence, the corrected steering assist amount AS1 is larger when the curve mark M indicates a curve that bends in both the left and right directions than when the curve mark M indicates a curve that bends only in one of the left and right directions. According to this setting, the steering assist amount AS1 can be appropriately determined depending on whether or not the curve C is a continuous curve (more specifically, depending on whether or not the curve C is a continuous steep curve requiring a change in the steering direction) by using the recognition result of the curve sign S. As a consequence, LTA can be continued more appropriately than in cases where this point is not considered. In addition, the bending direction information of the curve C can be obtained, for example, by reading the bending direction information about the recognized curve sign S from the sign type information Ic1 in the memory 12. Alternatively, the bending direction information may be obtained directly, for example, by analyzing an image of the curve mark M of the curve sign S obtained by the camera 21.

In FIG. 5, in S310 following S306 or S308, a steering assist amount AS (i.e., AS0 or AS1) is transmitted to EPS-ECU 31. Consequently, EPS-ECU 31 controls the steering actuator 30 so as to realize the steering assist amount AS. The drive assist control of the vehicle 1 may include, for example, an automatic acceleration/deceleration control (for example, an adaptive cruise control) that automatically performs acceleration/deceleration of the vehicle 1 together with LTA. When the automatic acceleration/deceleration control is executed together with LTA, the steering assist amount AS may also be transmitted to the brake ECU 40 to control the deceleration of the vehicle 1.

What is claimed is:

1. A drive assist device configured to assist a driver in driving a vehicle, the drive assist device comprising:
   a recognition sensor configured to recognize a situation ahead of the vehicle;
   a steering actuator configured to steer the vehicle; and
   an electronic control unit configured to control the steering actuator to suppress lane deviation of the vehicle from a traveling lane, wherein the electronic control unit is configured to
   recognize, using the recognition sensor, a curve sign for prompting the driver to pay attention to a curve ahead of the vehicle, and
   when the curve sign is recognized, increase a steering assist amount of the steering actuator for suppressing lane deviation during passage of the curve as compared with a case where the vehicle passes the curve without recognition of the curve sign.

2. The drive assist device according to claim 1, wherein the steering assist amount is at least one of a steering amount in a direction in which a wheel is steered to an inner side of the curve and an offset amount for offsetting a traveling position of the vehicle in a lane width direction on the traveling lane to an inner side of the curve with respect to a center of the traveling lane.

3. The drive assist device according to claim 1, wherein the electronic control unit is configured to, when a total angle of angles of arcs included in a curve mark in the recognized curve sign is large, increase the steering assist amount as compared with a case where the total angle is small.

4. The drive assist device according to claim 1, wherein the electronic control unit is configured to, when a curve mark in the recognized curve sign indicates a curve that bends both in right and left directions, increase the steering assist amount as compared with a case where the curve mark indicates a curve that bends only in one of the right and left directions.

* * * * *